Feb. 21, 1956
H. H. BUSCHERS
2,735,391
WARSHIP WEAPONS SYSTEM, INCLUDING AIRCRAFT
STORING AND LAUNCHING ARRANGEMENT
Filed July 25, 1952
4 Sheets-Sheet 1
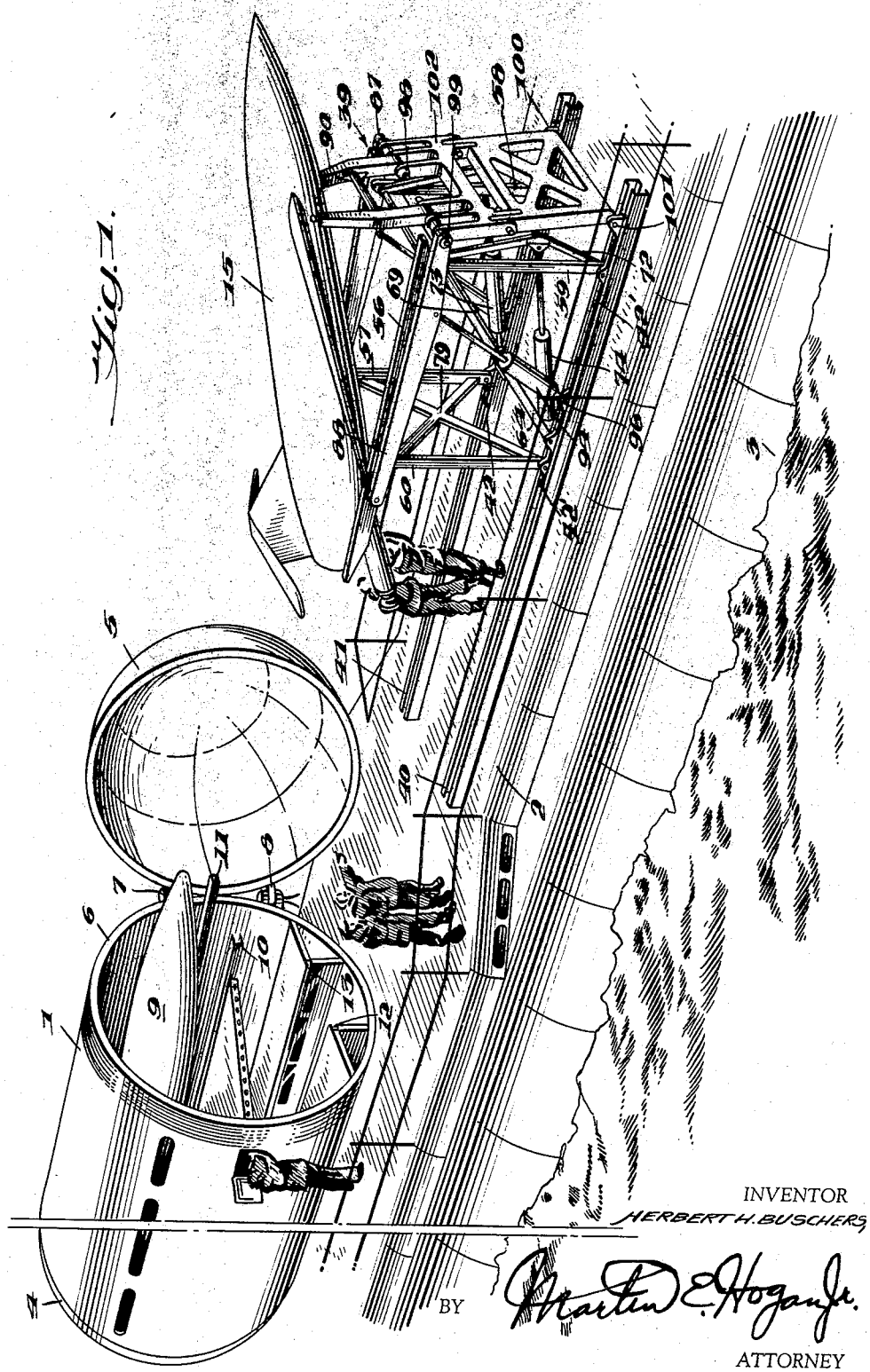
INVENTOR
HERBERT H. BUSCHERS
BY
ATTORNEY Feb. 21, 1956  H. H. BUSCHERS  2,735,391
WARSHIP WEAPONS SYSTEM, INCLUDING AIRCRAFT
STORING AND LAUNCHING ARRANGEMENT
Filed July 25, 1952  4 Sheets-Sheet 2
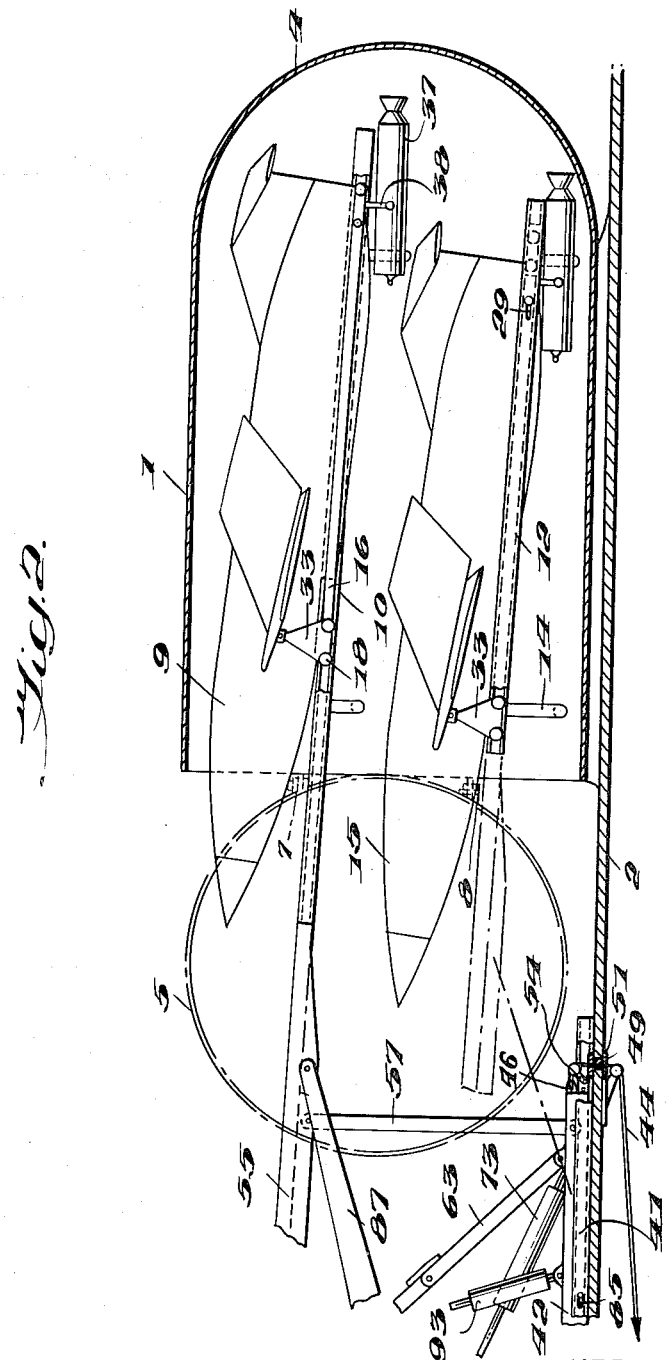
INVENTOR
HERBERT H. BUSCHERS,
BY Martin E. Hogan Jr.
ATTORNEY Feb. 21, 1956   H. H. BUSCHERS   2,735,391
WARSHIP WEAPONS SYSTEM, INCLUDING AIRCRAFT
STORING AND LAUNCHING ARRANGEMENT
Filed July 25, 1952   4 Sheets-Sheet 3
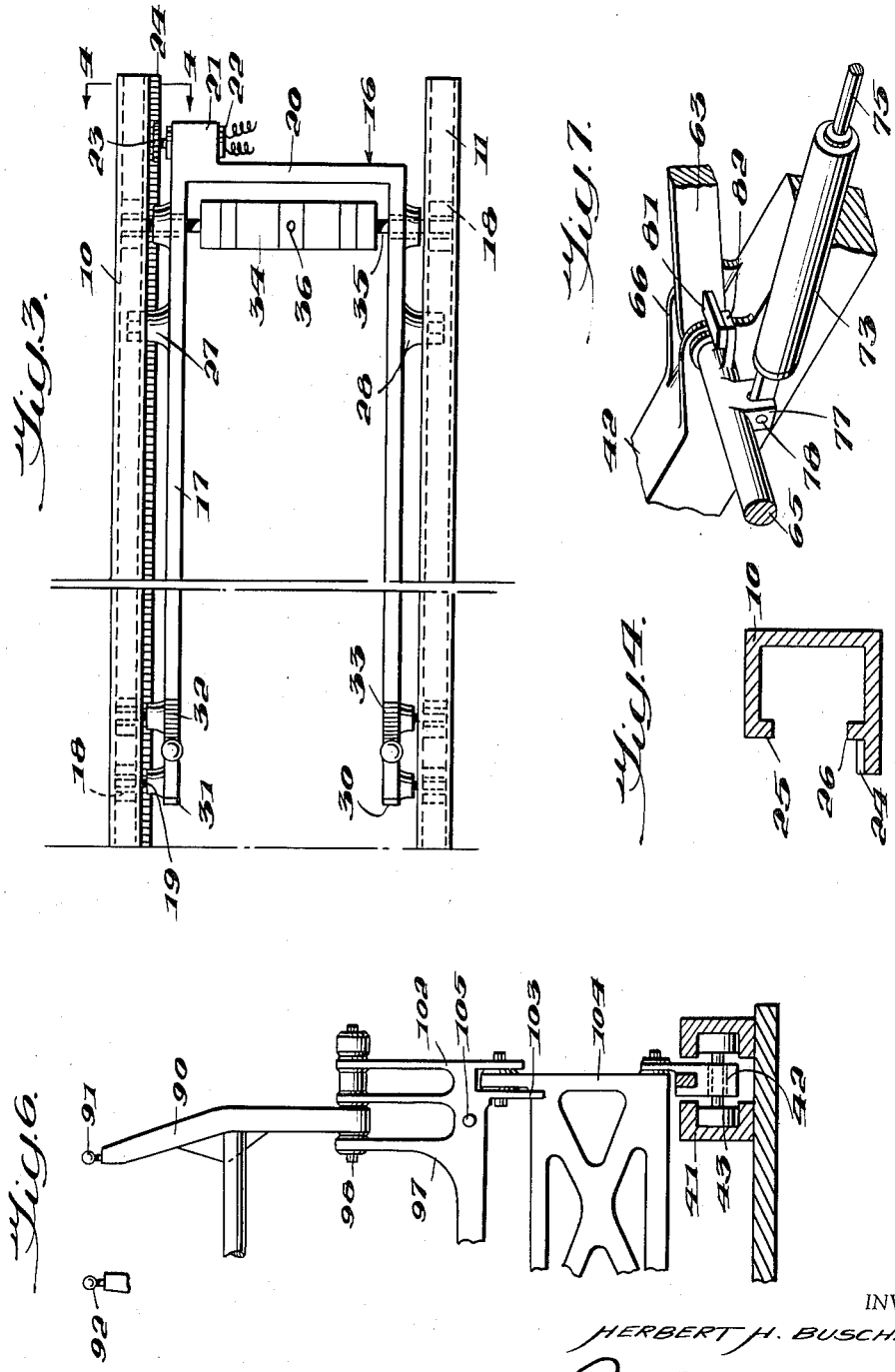
INVENTOR
HERBERT H. BUSCHERS,
BY Martin E. Hogan Jr.
ATTORNEY

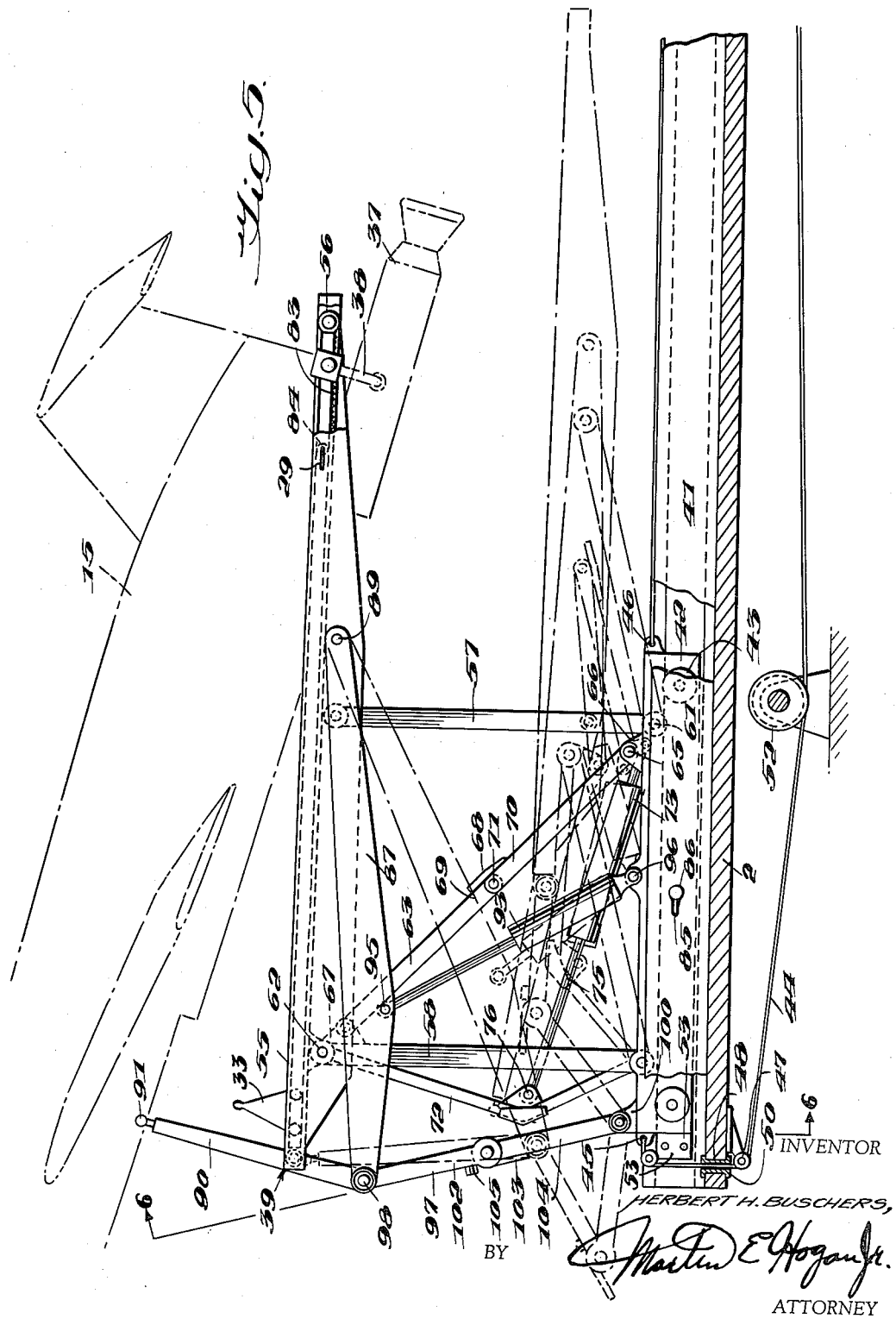

United States Patent Office 2,735,391
Patented Feb. 21, 1956

2,735,391

WARSHIP WEAPONS SYSTEM, INCLUDING AIRCRAFT STORING AND LAUNCHING ARRANGEMENT

Herbert H. Buschers, Towson, Md., assignor to The Glenn L. Martin Company, Middle River, Md., a corporation of Maryland Application July 25, 1952, Serial No. 300,921

6 Claims. (Cl. 114—1)

This invention relates to an aircraft storage and zero-length launching arrangement particularly adapted for submarines and the like wherein the aircraft to be launched are provided with sufficient auxiliary power to be thrust into the air and accelerated to flying speed from a static position.

The use of submarines for carrying and launching aircraft is obviously desirable from a military point of view since the aircraft may be carried great distances under water to a location near the target area for launching without detection from the enemy. The submarine can quickly surface, launch its aircraft, and submerge before the enemy is able to counterattack. Using electronics guidance equipment, the aircraft may be directed to the target many miles from the launching site.

To prevent salt water damage thereto, aircraft carried by a submarine must be housed within a closed hanger. For launching, the aircraft must be removed from the hangar and supported in a predetermined high angle of attack position.

One of the objects of this invention is to provide means for quickly and easily moving aircraft housed within a hangar to a position spaced from the hangar for launching.

Another object of this invention is to provide a retractable launcher adapted to receive either of a plurality of aircraft stored within a hangar and support said aircraft in a launching position.

Still another object of this invention is to provide an aircraft storage and launching arrangement requiring a minimum of space so as to be readily adapted for use on the deck of a submarine.

Further and other objects will become apparent from the accompanying description and drawings which form a part of this disclosure and in which like numerals refer to like parts.

Figure 1 is a perspective view showing the general arrangement of the hangar and launcher of this invention mounted on the deck of a submarine.

Figure 2 is a fragmentary sectional side view of the hangar.

Figure 3 is a view showing the aircraft supporting dolly and drive mechanism.

Figure 4 is a view taken on line 4—4 of Figure 3.

Figure 5 is a side view of the retractable launcher.

Figure 6 is a view taken on line 6—6 of Figure 5.

Figure 7 is a perspective view showing a portion of the launcher retracting mechanism.

The general arrangement in Figure 1 shows the generally cylindrical hangar 1 secured on the deck 2 of a submarine 3 wherein the axis of the hangar is generally parallel with the deck. A dome shaped end member 4 integral with the hangar seals one end thereof. A dome shaped door 5, adapted to provide closure means for the opposite end 6 of hangar 1, is swingably carried by hinges 7 and 8 secured to the side wall of the hangar so as to swing to the open position shown in Figure 1 for removing the aircraft carried within the hangar. When door 5 is closed, the hangar is rendered water-tight so that when submerged, the aircraft stored therein are protected.

As shown in Figures 1 and 2, two pairs of spaced hangar guide rails 10 and 11, and 12 and 13 are fixedly carried within the hangar by suitable supports 14 and arranged one pair above the other for supporting two aircraft 9 and 15 in stacked relationship within the hangar on dollies 16.

Each dolly 16, as best shown in Figure 3, includes a generally U-shaped frame 17 supported by one of the pair of hangar guide rails such as rails 10 and 11 through a plurality of rollers 18 carried by frame 17 through shafts 19 so as to be freely movable therealong. The crosspiece 20 at the rearward end of frame 17 is provided with a bracket 21 supporting a drive motor 22 controlling the movement of dolly 16 along the guide rails through suitable gearing 23 which engages a rack 24 formed integral with track 10. The cross sectional shape of the hangar rails is best shown in Figure 4 wherein the generally U-shaped channel is provided with projections 25 and 26 on the open side thereof so as to positively restrict the side movement of dolly 16. The relationship of rack 24 with the hangar guide rail is also shown in Figure 4. Hangar rails 12 and 13 are identical to hangar rails 10 and 11 so that the aircraft supporting dollies may be used on either the upper or lower pair of rails.

Suitable means are provided for locking dolly 16 in its desired position on the guide rails as represented by projections 27 and 28 secured to frame 17 of dolly 16, each of which is adapted to receive a locking pin 29 as shown in Figure 2, wherein the pin is inserted through an opening formed in the guide rail and into an aperture formed in the projection. The forward ends 30 and 31 of dolly 16 are provided with upwardly extending brace members 32 and 33 as shown in Figures 2 and 3 on which the forward portion of aircraft 9 or 15 is supported. A cradle 34 is pivotally supported adjacent the rearward end of dolly 16 through shaft 35 for supporting the rearward end of aircraft 9 or 15. A shear pin 36 secured to cradle 34 engages the aircraft resting thereon so as to restrain any undesirable relative movement between the aircraft and the dolly prior to launching. By supporting the aircraft on the dolly in this manner and having the dolly movable along the hangar guide rails by the operation of motor 22 the aircraft may be readily moved from its position within the hangar for launching as hereinafter described.

In order to zero-length launch the aircraft stored within hangar 1, they are each provided with an auxiliary rocket booster motor 37 which is pivotally carried by bracket 38 secured to the aircraft adjacent the tail end thereof and forwardly of cradle 34. Immediately before launching, rocket motor 37 is positioned so that its thrust axis will maintain a predetermined angular position relative to the longitudinal axis of the aircraft. Since bracket 38 is located forwardly of cradle 34, structural interference to forward motion of the aircraft relative to the dolly during launching is avoided.

A launcher 39 is supported for movement toward and away from hangar 1 as shown in Figure 1 along a pair of tracks 40 and 41 secured to the deck 2 of submarine 3. Tracks 40 and 41 are generally parallel with hangar guide rails 10 and 11 and 12 and 13. The cross sectional shape of tracks 40 and 41 is best shown in Figure 6 wherein each track consists of a pair of U-shaped channels arranged on either side of a launcher base member 42 or 42', one for each track 40 and 41, so as to engage rollers 43 carried by the base member.

Suitable means for controlling the movement of the launcher along tracks 40 and 41 is shown in Figure 5. One end of a cable 44 inside the submarine is fed through an opening 48 formed in deck 2 and connected to a bracket 45 secured to the forward end of base member 42. The opposite end of cable 44 is fed through an opening 49 formed in deck 2 as shown in Figure 2 and connected to a bracket 46 secured to the rearward end of base member 42. A plurality of pulleys 47 are provided for directing cable 44 to a power driven drum 52 carried within the submarine. Cable 44 is wound around drum 52 so that by rotation of the drum, cable 44 is caused to move launcher 39 along tracks 40 and 41. Pressure tight sealing grommets 50 and 51 are inserted in apertures 48 and 49 around cable 44 to prevent water from passing therethrough. With this arrangement the power means for moving the launcher is located inside the submarine where it is protected from salt water when submerged. If desired a similar cable system could be used with base member 42' in cooperation with the one connecting with base member 42.

The movement of launcher 39 along tracks 40 and 41 towards and away from the hangar is limited by stop blocks 53 and 54 secured to the guide rails as shown in Figures 5 and 2 respectively.

The base members 42 and 42', one carried by each track 40 and 41, support a pair of launcher guide rails 55 and 56 through legs 57, 58, 59 and 60 which are pivotally connected at one end to the base members through pins as at 61 and at their opposite end to the launcher guide rails 55 and 56 through pins as at 62, so that rails 55 and 56 may be moved from the extended position to a retracted position generally parallel with deck 2, as indicated in Figure 5, by simply swinging the legs rearwardly. Cross braces 79 rigidly connect the two forward pair of legs 58 and 59 together and the two rear pair of legs 57 and 60 together as shown in Figure 1 so as to prevent relative movement between base members 42 and 42'. A pair of toggle members 63 and 64 are pivotally connected at one end to a shaft 65 rotatably carried by base members 42 and 42' through brackets 66 as best shown in Figure 7. The opposite end of toggle members 63 and 64 are pivotally connected to brackets 67 on legs 58 and 59 as best shown in Figure 5. A projection 68 secured to the lower arm 70 of each toggle 63 and 64 is adapted to butt against the upper arm 69 of each toggle adjacent pin connection 71 connecting the toggle arms 69 and 70 when the upper and lower arms are in coaxial alignment for locking the launcher in its extended position.

A brace member 72 secured to the forward legs 58 and 59 connects with a pair of launcher lifting cylinders 73 and 74 as shown in Figure 1. As best shown in Figure 7, cylinder 73 connects with a bracket 77 on shaft 65 through pin 78. Piston rod 75 of cylinder 73 connects with brace member 72 through pin 76 as shown in Figure 5. Cylinder 74 connects with shaft 65 and with brace member 72 in like manner whereby simultaneous actuation of cylinders 73 and 74 raises and lowers launcher 39 from and to the extended position.

Means for automatically unlocking toggle members 63 and 64 for lowering the launcher to the retracted position is best shown in Figure 7 wherein a detent 81 on toggle 63 is adapted to contact a lug 82 on shaft 65 so that the limited rotation of shaft 65 due to actuation of cylinders 73 and 74 applies a force on the toggle urging it from its locked position. Toggle 64 is unlocked in the same manner as toggle 63. Further actuation of cylinders 73 and 74 then retracts the launcher to the position shown in phantom in Figure 5.

The length of legs 57, 58, 59 and 60 is such that when launcher 39 is in the raised or extended position the distance of launcher guide rails 55 and 56 from deck 2 of the submarine is the same as the distance of hangar guide rails 10 and 11 from deck 2. Also, the spacing between launcher guide rails 55 and 56 is substantially the same as the spacing between the hangar guide rails. Therefore, when launcher 39 is moved along tracks 40 and 41 to its rearward position adjacent hangar 1, launcher guide rails 55 and 56 and hangar guide rails 10 and 11 are in end to end engagement and substantially coaxially aligned as shown in Figure 2. By having the cross sectional shape of launcher guide rails 55 and 56 the same as the cross sectional shape of the hangar guide rails and having a rack 83 on rail 56 like rack 24 on hangar guide rails 10 and 12, movement of dolly 16 onto the launcher may be readily effected by operation of drive motor 22.

Loading aircraft 15 carried by the lower hangar guide rails 12 and 13 onto launcher 39 is effected by retracting the launcher and moving it rearwardly along tracks 40 and 41 until launcher guide rails 55 and 56 are in end to end engagement and substantially coaxially aligned with hangar guide rails 12 and 13 as indicated in Figure 2. The dolly drive motor is then actuated to move aircraft 15 onto the launcher in the same manner that aircraft 9 is moved onto the launcher. As best shown in Figure 5, the linkage arrangement of the launcher is such that it folds down out of the way of the aircraft being positioned thereon in the retracted position so as not to interfere with the loading operation.

After the aircraft and supporting dolly are moved onto launcher 39, locking pin 29 is inserted through an opening 84 in launcher guide rails 55 and 56 and into engagement with projections 27 and 28 for locking the dolly in position as shown in Figure 5.

Suitable means for locking launcher 39 in position relative to rails 40 and 41 is shown in Figure 5 wherein a pin 85 is inserted through an aperture 86 formed in rail 42 and launcher base member 42.

To successfully launch an aircraft from a stationary position in the manner employed in the practice of this invention it must be supported in a predetermined high lift attitude near the stalling angle of attack. In order to support the aircraft on launcher 39 in this desired high angle of attack position a pair of beams 87 and 88 of an aircraft elevating mechanism are pivoted at one end adjacent the rearward end of launcher rails 55 and 56 as at 89 so as to extend generally parallel with the launcher rails and beyond the forward end thereof for swingably supporting an arm 90 through pins 98 and 99. Arm 90 is provided with a pair of generally spherical tip members 91 and 92 adapted to seat against the underside of the aircraft as indicated in Figure 5. By swinging beams 87 and 88 about their pivotal connection with launcher rails 55 and 56, arm 90 will serve both to elevate the aircraft to the launching attitude and to support it in that attitude for launching. This movement of beams 87 and 88 is controlled by a pair of actuating cylinders 93 and 94 which are connected as shown in Figures 1 and 5 so as to act between launcher base members 42 and 42' and beams 87 and 88 through pivotal connections as at 95 and 96.

To lock the aircraft elevating mechanism in the launching position and relieve the strain on actuating cylinders 93 and 94, a toggle member 97 is employed which is pivotally secured at one end to beams 87 and 88. The other end of toggle 97 is pivotally carried by brackets 100 and 101 secured to the forward end of launcher base members 42 and 42'. The upper arm 102 of toggle 97 is provided with a projection 103 adapted to lock the upper arm 102 and lower arm 104 in their coaxially aligned position for preventing movement of beams 87 and 88 and relieving actuating cylinders 93 and 94. The length of toggle member 97 is such that when it is in the locking position, arm 90, engaging the aircraft, is in the elevated position supporting the aircraft in the desired attitude for launching. Toggle 97 is unlocked manually after launching, though it is obvious that an automatic unlocking arrangement like that shown for toggle members 63 and 64 could be provided if deemed desirable.

Arm 90 being pivotally carried at the forward end of beams 87 and 88 is free to swing forwardly as the aircraft is launched so as not to restrain its forward motion. It is important that the motion of arm 90 is such as to not cause the aircraft to pitch upwardly as it leaves the launcher. Therefore the position of arm 90 relative to the aircraft when in the elevated or launching position is generally normal to the longitudinal axis of the aircraft whereby swinging motion of the arm during launching is always forwardly and downwardly from the aircraft and not towards it. The high acceleration of the aircraft in this type of launching causes arm 90 to swing about its pivot point with considerable momentum. Suitable means are provided for absorbing the energy in the swinging arm and to prevent it from rebounding up into the path of the aircraft during launching by a resilient pad 105 secured to the upper arm 102 of toggle 98.

While the launcher is not in use it is maintained in the retracted position shown in phantom in Figure 5 so as to offer a minimum of drag to the submarine when underwater. Door 5 of hangar 1 is locked in closed position providing a watertight compartment for the aircraft stored therein. When the launching area is reached the submarine surfaces and prepares to launch its aircraft. Door 5 of the hangar is opened and launcher 39 is moved rearwardly along tracks 40 and 41 to the position adjacent hangar 1 wherein launcher guide rails 55 and 56 are coaxially aligned in end to end engagement with hangar guide rails 12 and 13 by operation of drum 52 carried inside the submarine. Launcher 39 is locked in position relative to tracks 40 and 41 by means of pin 85. Dolly 16 supporting aircraft 15 within the hangar is then moved along the guide rails and onto the launcher by operation of dolly drive motor 22. When the aircraft and dolly are positioned properly relative to launcher guide rails 55 and 56, the dolly is locked into position by means of locking pin 29. Locking pin 85 is removed and launcher 39 is then moved along tracks 40 and 41 by operation of drum 52 to the most forward location shown in Figure 1 and locked in position by means of locking pin 85. Actuating cylinders 73 and 74 are then caused to raise the launcher to its extended position. Toggle members 63 and 64 automatically swing into the locked position when the launcher is fully extended, providing a rigid structure for supporting the aircraft to be launched. Rocket booster motor 37 is angularly positioned so that its thrust axis is properly aimed. Arm 90 is then manually swung into a generally vertical position for contacting the underside of the aircraft adjacent the forward end of the launcher. Actuating cylinders 93 and 94 are then actuated to cause beams 87 and 88 to swing upwardly for elevating the aircraft into the launching attitude. Toggle 97 automatically moves into the locked position providing a rigid support for arm 90 which supports the aircraft in the launching position. Since cradle 34 forming a part of dolly 16 is pivotally carried through shaft 35 as shown in Figure 3, the angular movement of the aircraft from its position on the forward dolly supports to the launching position shown in Figures 1 and 5 is unrestrained. Shear pin 36 secured to cradle 34 prevents longitudinal movement of the aircraft relative to the dolly and launcher until the aircraft power plant and rocket booster motor develop a predetermined amount of thrust, at which time shear pin 36 is broken allowing the aircraft to move from the launcher and accelerate to flying speed in a matter of seconds. The initial movement of the aircraft as it leaves the launcher causes arm 90 of the elevating mechanism to swing downwardly and out of the path of the moving aircraft. The energy in swinging arm 90 is absorbed in the resilient pad 105 secured to toggle 97 so that it will not rebound into the path of the aircraft before the aircraft has moved free of the launcher.

After the aircraft has been launched, toggle 97 is unlocked and cylinders 93 and 94 are actuated to lower beams 87 and 88. Launcher 39 is retracted and pin 85 is removed so as to permit launcher 39 to be moved rearwardly towards hangar 1 by operation of drum 52 to the position shown in Figure 2 wherein launcher guide rails 55 and 56 are in end to end engagement with hangar guide rails 12 and 13. Pin 29 locking the un- loaded dolly to the launcher is removed and the dolly drive motor is energized to move the dolly back onto the hangar guide rails. The launcher is then raised to the extended position by actuating of cylinders 73 and 74 so that launcher guide rails 55 and 56 are in generally coaxial alignment with the upper hangar guide rails 10 and 11. Launcher 39 is then moved rearwardly to the position shown in Figure 2 wherein the hangar guide rails 10 and 11 and the launcher guide rails are in end to end contact. Aircraft 9 supported by the dolly in hangar guide rails 10 and 11 is then moved onto the launcher by operation of the dolly drive motor and locked in position on the launcher in the same manner as described in connection with the loading of aircraft 15 supported in the lower hanger rails 12 and 13. Launcher 39, with aircraft 15 mounted thereon, is moved along tracks 40 and 41, by the operation of drum 52, to the forward position shown in Figure 1. The launcher is then locked in position by means of pin 85 and the aircraft is elevated to the launching attitude by operation of the elevating mechanism and launched. Dolly 16 is transferred to the hangar after launching the aircraft provided there is sufficient time to do so. Launcher 39 is then retracted to the lower most position close to the deck of the submarine so as to offer a minimum resistance to the underwater movement of the submarine. Door 5 of the hangar is also closed so as to offer minimum underwater drag and to prevent water from entering the hangar and damaging equipment carried therein.

The launcher loading system described herein requires a minimum of manual operations whereby the aircraft may be launched quickly and easily. Therefore the submarine is able to launch its aircraft and submerge before an enemy near the target area can determine its location and counterattack.

Although the launcher and hangar arrangement has been described for use on a submarine it is merely by way of example and is not intended to limit the invention. It is to be understood that certain changes, alterations, modifications and substitutions can be made without departing from the spirit and scope of the appended claims.

I claim as my invention:

1. An aircraft storage and launching arrangement particularly adapted for use on the deck of ships of the submarine type comprising, a hangar secured to said deck, said hangar having a plurality of pairs of spaced hangar guide rails carried therein for supporting a plurality of aircraft in stacked relationship one above the other, a pair of spaced guide rails secured to said deck adjacent said hangar and extending in a direction generally parallel with said hangar guide rails, a retractable launcher carried by said last mentioned guide rails for movement therealong between a loading position adjacent said hangar and a launching position spaced from said hangar, said launcher including a pair of launcher guide rails extending generally parallel with said hangar guide rails, a retracting mechanism carried by said launcher for raising and lowering said launcher guide rails so as to be coaxially aligned with either of said plurality of pairs of hangar guide rails whereby in loading position said launcher guide rails engage said hangar guide rails in end to end relationship, means for moving said aircraft along said rails and onto said launcher when said launcher and hangar guide rails are coaxially aligned and in end to end engagement, means for releasably securing said aircraft in position on said launcher, and means for locking said launcher in the raised position for launching said aircraft.

2. An aircraft storage and launching system comprising a support, a hanger carried by said support and having a plurality of pairs of spaced hangar guide rails carried therein and arranged one above the other in stacked relationship, each said pair of guide rails being adapted to support an aircraft for movement therealong, a pair of spaced guide rails carried by said support adjacent said hangar and extending in a generally parallel direction with said hangar guide rails, a retractable launcher carried by said last mentioned guide rails for controlled movement therealong towards and away from said hangar, said launcher including a base frame, a plurality of legs pivotally connecting with said base frame for controlled swinging movement relative thereto from a retracted to a normally extended launching position, a pair of spaced launcher guide rails carried by said legs and adapted to be generally coaxially aligned with one of said pairs of hangar guide rails when said legs are in retracted position and with another of said pair of hangar guide rails when said legs are in the normally extended position, and means for moving said launcher towards said hangar whereby said launcher guide rails engage a pair of said hangar guide rails in end to end relationship whereby an aircraft carried within said hangar may be moved from said hangar guide rails to said launcher guide rails for launching.

3. An aircraft storage and zero-length launching arrangement for use on ships and the like comprising, a hangar carried by said ship and having an opening formed at one end thereof, said hangar having a plurality of pairs of spaced guide rails carried therein in stacked relationship for supporting a plurality of aircraft, a pair of spaced guide rails carried by said ship and terminating at one end adjacent the opening formed in said hangar, a retractable launcher carried by said guide rails for movement therealong between a loading position at said one end adjacent said hangar and a launching position at the opposite end spaced from said hangar, said launcher including a pair of launcher guide rails, a retracting mechanism carried by said launcher for raising and lowering said launcher guide rails so as to be coaxially aligned with either of said plurality of pairs of hangar guide rails whereby in loading position said launcher guide rails engage said hangar guide rails in end to end relationship, means for moving said aircraft along said hangar guide rails and onto said launcher guide rails when said hangar and launcher guide rails are coaxially aligned and in end to end engagement, means for releasably securing said aircraft to said launcher, means for locking said hangar guide rails in the raised position, means for locking said launcher in the launching position spaced from said hangar, and means for elevating said aircraft to a launching attitude.

4. An aircraft storage and launching arrangement comprising supporting structure, a hangar carried by said supporting structure and having a plurality of pairs of spaced guide rails carried therein for supporting a plurality of aircraft in stacked relationship one above the other, a pair of spaced guide rails carried by said supporting structure and extending from adjacent said hangar in a generally axial direction relative to said hangar guide rails to a position spaced from said hangar, a retractable launcher carried by said last mentioned guide rails for movement therealong, said launcher including a pair of launcher guide rails extending generally parallel with said hangar guide rails, a retracting mechanism carried by said launcher for lowering said launcher guide rails from a normally extended position so as to be generally coaxially aligned with either of said plurality of pairs of hangar guide rails, means for moving said launcher from a firing position spaced from said hangar to a loading position adjacent said hangar wherein said launcher guide rails abutt a pair of said hangar guide rails in end to end relationship, means for moving an aircraft from said hangar guide rails onto said launcher guide rails, means for securing said aircraft on said launcher, and means for raising said aircraft to a launching attitude on said launcher for launching.

5. An aircraft storage and launching arrangement particularly adapted for use on the deck of ships of the submarine type comprising, a hangar secured to said deck, said hangar having a plurality of pairs of spaced hangar guide rails carried therein for supporting a plurality of aircraft in stacked relationship one above the other, a pair of spaced guide rails secured to said deck adjacent said hangar and extending in a direction generally parallel with said hangar guide rails, a launcher including a base frame carried by said last mentioned guide rails for movement therealong from a loading position adjacent said hangar to a launching position spaced from said hangar, a plurality of legs swingably carried by said base frame, a pair of spaced launcher guide rails carried by said plurality of legs for supporting an aircraft to be launched, toggle means for locking said legs in a normally extending launching position, actuating means connecting with said base frame and said legs for controlling the swinging movement of said legs whereby to position said launcher guide rails into coaxial alignment with either of said pairs of hangar guide rails, means responsive to actuation of said actuating means for automatically unlocking said toggle, means for moving said aircraft along said rails and onto said launcher when said hangar guide rails and said launcher guide rails are in coaxial alignment, and means carried by said launcher for elevating said aircraft to a launching attitude including an arm adapted to supportingly engage the underside of said aircraft, said arm being swingably carried to permit unrestrained forward movement of said aircraft during launching.

6. An aircraft storage and launching arrangement particularly adapted for use on the deck of ships of the submarine type comprising, a hangar secured to said deck, said hangar having a plurality of pairs of spaced hangar guide rails carried therein in stacked relationship, a dolly carried by each said pair of hangar guide rails for supporting an aircraft thereon, a pair of spaced guide rails secured to said deck adjacent said hangar and extending in a direction generally parallel with said hangar guide rails, a launcher including a base frame carried by said last mentioned guide rails for movement therealong from a loading position adjacent said hangar to a launching position spaced from said hangar, a plurality of legs swingably carried by said base frame, a pair of spaced launcher guide rails carried by said plurality of legs for supporting an aircraft to be launched, toggle means for locking said legs in a normally extending launching position, actuating means connecting with said base frame and said legs for controlling the swinging movement of said legs whereby to position said launcher guide rails into coaxial alignment with either of said pairs of hangar guide rails, means responsive to actuation of said actuating means for automatically unlocking said toggle, drive means carried by each said dolly for moving said dolly and aircraft along said rails and onto said launcher when said hangar guide rails and said launcher guide rails are in coaxial alignment, and means carried by said launcher for elevating said aircraft to a launching attitude including an arm adapted to supportingly engage the underside of said aircraft, said arm being swingably carried to permit unrestrained forward movement of said aircraft during launching.

References Cited in the file of this patent

UNITED STATES PATENTS 2,135,033    Courtney  ---------------- Nov. 1, 1938

FOREIGN PATENTS 673,550    Great Britain ----------- June 11, 1952

(Patent 502,015 (Belgian) April 14, 1951, is the same as 673,550 above).